United States Patent
Kumagai et al.

(10) Patent No.: US 9,243,897 B2
(45) Date of Patent: Jan. 26, 2016

(54) THREE-DIMENSIONAL MEASURING DEVICE AND THREE-DIMENSIONAL MEASURING SYSTEM

(71) Applicant: Kabushiki Kaisha TOPCON, Itabashi-ku, Tokyo-to (JP)

(72) Inventors: Kaoru Kumagai, Tokyo-to (JP); Takahiro Inoue, Tokyo-to (JP); Ken-ichiro Yoshino, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 307 days.

(21) Appl. No.: 14/050,414

(22) Filed: Oct. 10, 2013

(65) Prior Publication Data

US 2014/0111618 A1 Apr. 24, 2014

(30) Foreign Application Priority Data

Oct. 19, 2012 (JP) .................................. 2012-231949

(51) Int. Cl.
*G01B 11/14* (2006.01)
*G01C 1/04* (2006.01)
*G01C 15/00* (2006.01)

(52) U.S. Cl.
CPC *G01B 11/14* (2013.01); *G01C 1/04* (2013.01); *G01C 15/002* (2013.01)

(58) Field of Classification Search
CPC ....................................................... G01B 11/14
USPC .......................................................... 348/46
See application file for complete search history.

(56) References Cited

U.S. PATENT DOCUMENTS

| 6,804,380 | B1 | 10/2004 | Ioannou et al. |
| 8,294,769 | B2 | 10/2012 | Otani et al. |
| 8,395,665 | B2 | 3/2013 | Otani et al. |
| 2006/0279745 | A1 | 12/2006 | Wenstrand et al. |
| 2008/0074637 | A1* | 3/2008 | Kumagai ............. G01C 15/002 356/4.01 |

(Continued)

FOREIGN PATENT DOCUMENTS

| DE | 10 2010 024 014 A1 | 12/2011 |
| JP | 2010-237169 A | 10/2010 |
| WO | 2011/098131 A1 | 8/2011 |

OTHER PUBLICATIONS

European communication dated Dec. 3, 2014 in corresponding European patent application No. 13188772.1.

*Primary Examiner* — Jay Patel
*Assistant Examiner* — Yulin Sun
(74) *Attorney, Agent, or Firm* — Nields, Lemack & Frame, LLC

(57) ABSTRACT

A three-dimensional measuring device includes a light source unit, a light projecting optical unit, a light receiving optical unit, a light receiving element, a scanning unit, an angle detector, an illumination light source unit, an image pickup unit and a control arithmetic unit. The control arithmetic unit comprises a distance data processing unit for controlling the scanning unit, for calculating a distance to the object to be measured based on a received light signal, and for calculating a three-dimensional data of the object based on a calculated distance and a detection signal from the angle detector, and an image data processing unit for acquiring an illuminated image and an unilluminated image, for acquiring a difference image based on both images, for detecting a retroreflective target based on the difference image and a detected intensity of a reflected light from the difference image, and for calculating a position of the target.

14 Claims, 8 Drawing Sheets

(56) References Cited

U.S. PATENT DOCUMENTS

2010/0091263 A1* 4/2010 Kumagai ................ G01C 3/08
356/4.01
2010/0245587 A1 9/2010 Otani et al.
2012/0229870 A1* 9/2012 Inoue ..................... G01S 17/89
358/448
2012/0249997 A1* 10/2012 Matsumoto ........... G01S 7/4817
356/4.01

* cited by examiner

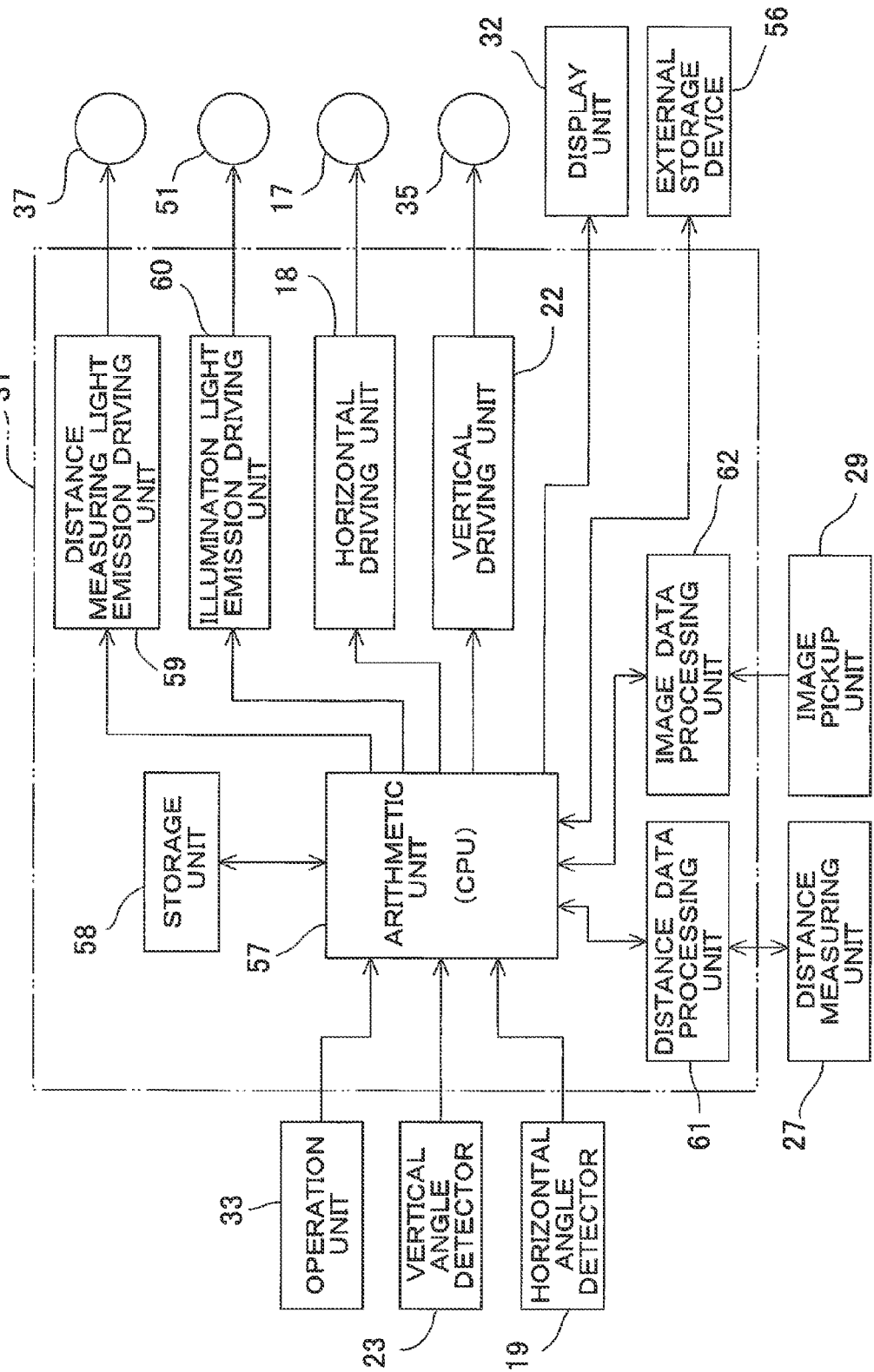

THREE-DIMENSIONAL MEASURING DEVICE AND THREE-DIMENSIONAL MEASURING SYSTEM

BACKGROUND OF THE INVENTION

The present invention relates to a three-dimensional measuring device and a three-dimensional measuring system capable of acquiring many three-dimensional data.

In the past, as a measuring device for acquiring many three-dimensional data (3D data) (three-dimensional point cloud data) of an object to be measured in a short time, a three-dimensional laser scanner has been known.

In a case where a three-dimensional point cloud data is acquired by a three-dimensional laser scanner, a installation position of the three-dimensional laser scanner has to become known. The procedure for measuring the installation position of the three-dimensional laser scanner is as follows. A target is installed at a known position and measured by the three-dimensional laser scanner. Based on the installation position of the target and the measurement result of the target, the installation position of the three-dimensional laser scanner is made known.

In the past, as a method for measuring a target, a target with retroreflective ability (e.g., a reflective sheeting) is employed, and by detecting a reflected light from the target (detecting a light spot), a distance and an angle are measured, and the three-dimensional data of the target are acquired.

Further, in prior arts, in order to detect a target, a distance measuring light has to be scanned over an area in which the target exists. Further, in order to discriminate a retroreflective object from other objects to be measured, an adjustment of a received light quantity and a scanning operation of the distance measuring light have to be performed repeatedly. Therefore, it takes time to detect the target and the measurement of the installation position is inefficient.

JP-A-2010-237169 discloses a method comprising a light spot detection step of projecting a flashing light (pulsed light) toward a target and detecting a light reflected from the target as a light spot, a step of acquiring a moving image of the target and a support unit for the target, a step of detecting the target based on the light spot detection, a step of tracking an image based on the moving image in parallel with the target detection step, a step of comparing a target position obtained by the target detection with an image position obtained by the image tracking, wherein when the target position and the image position are in a predetermined range, the result of the target detection is recognized as the target position and a false recognition is avoided.

Meanwhile, the specification of the U.S. Pat. No. 6,804,380 discloses a method that, in order to measure an arbitrary point such as a tie-point or a subsequent starting point for connecting point cloud data acquired from a plurality of installation positions by a three-dimensional measuring device, a retroreflective region is detected by scanning a distance measuring light over a target sheet with a circular retroreflective region, and a center of the retroreflective region is obtained, and an optical axis of the distance measuring light is aligned with the center of the retroreflective region, and a distance and an angle of the arbitrary point are measured, so a target position is recognized.

SUMMARY OF THE INVENTION

It is an object of the present invention to provide a three-dimensional measuring device and a three-dimensional measuring system capable of reliably recognizing a target without a false recognition.

To attain the above object, the present invention provides a three-dimensional measuring device comprising a light source unit for generating a distance measuring light, a light projecting optical unit for projecting the distance measuring light from the light source unit on a distance measuring optical axis, a light receiving optical unit for receiving a reflected light from an object to be measured, a light receiving element for converting the reflected light condensed by the light receiving optical unit into an electric signal, a scanning unit for scanning the distance measuring light over the object to be measured, an angle detector for detecting an projecting direction of the distance measuring light scanned by the scanning unit, an illumination light source unit for projecting an illumination light having a plurality of wavelengths, an image pickup unit for acquiring two-dimensional images of the plurality of wavelengths and a control arithmetic unit, wherein the control arithmetic unit comprises a distance data processing unit for controlling a drive of the scanning unit, for calculating a distance to the object to be measured based on a received light signal from the light receiving element, and for calculating a three-dimensional data of the object to be measured based on a calculated distance and a detection signal from the angle detector and an image data processing unit for acquiring an image illuminated with the illumination light source unit and an unilluminated image by the image pickup unit, for acquiring a difference image based on both images, for detecting a retroreflective target based on the difference image and a detected intensity of a reflected light having a plurality of wavelengths detected from the difference image, and for calculating a position of the target.

Also, the invention provides the three-dimensional measuring device as described above, wherein based on a light intensity distribution of an image acquired from the difference image of the images acquired by the image pickup unit, target candidates are detected, and based on a light intensity relationship between the target candidates in the plurality of wavelengths, the target is detected.

Further, the invention provides the three-dimensional measuring device as described above, wherein the image pickup unit has a light receiving element sensitive to a blue, a green and a red, and the illumination light source unit irradiates a white light or a light including a plurality of monochromatic lights, and the image data processing unit judges a hue of the reflected light based on a ratio of each color in an acquired difference image and detects the target based on the hue.

Also, the invention provides the three-dimensional measuring device as described above, wherein the illumination light source unit irradiates a plurality of monochromatic lights, and the image data processing unit judges a hue of the reflected light based on a ratio of light quantities and an intensity between a plurality of difference images acquired by projecting the plurality of monochromatic lights and detects the target based on the hue.

Further, the invention provides the three-dimensional measuring device as described above, wherein the image pickup unit has a light receiving element sensitive to a blue, a green and a red, and the illumination light source unit irradiates a white light or a light including a plurality of monochromatic lights and at least one monochromatic light, and the image data processing unit judges a hue of the reflected light based on a ratio of each color in an acquired difference image projected with the white light and detects the target, and based on a difference image projected with the monochromatic light, also discriminate a white background light which varies on a time-series basis.

Also, the invention provides the three-dimensional measuring device as described above, wherein the target has an optical property of selectively reflecting a monochromatic light of a predetermined wavelength, and the illumination light source unit irradiates a monochromatic light with an identical color to the target and a monochromatic light with a complementary color to the target, and the image data processing unit detects the target from two acquired difference images based on a difference between received light intensities.

Further, the invention provides the three-dimensional measuring device as described above, wherein the illumination light source unit has a light emitting source coaxially aligned with respect to an optical center axis of the image pickup unit.

Also, the invention provides the three-dimensional measuring device as described above, wherein the illumination light source unit has a plurality of light emitting sources point-symmetrically disposed with respect to an optical center axis of the image pickup unit.

Further, the invention provides the three-dimensional measuring device as described above, wherein for the target, the control arithmetic unit acquires a plurality of difference images by the image pickup unit, while changing an image pickup direction at an angle smaller than a pixel pitch with the scanning unit, and by superimposing the difference images based on an angle from the angle detector, a detection accuracy of the reflected light is improved.

Also, the invention provides the three-dimensional measuring device as described above, which includes a wavelength selector capable of selecting a wavelength of a light entering the image pickup unit.

Further, the present invention provides a three-dimensional measuring system which comprises a three-dimensional measuring device installed at an arbitrary position and a target installed at a known position, comprising the three-dimensional measuring device including a light source unit for generating a distance measuring light, a light projecting optical unit for projecting the distance measuring light from the light source unit on a distance measuring optical axis, a light receiving optical unit for receiving a reflected light from an object to be measured, a light receiving element for converting the reflected light condensed by the light receiving optical unit into an electric signal, a scanning unit for scanning the distance measuring light over the object to be measured, an angle detector for detecting an projecting direction of the distance measuring light scanned by the scanning unit, an illumination light source unit for irradiating an illumination light having a plurality of wavelengths, an image pickup unit for acquiring two-dimensional images of the plurality of wavelengths, an image data processing unit for acquiring an image illuminated with the illumination light source unit and an unilluminated image by the image pickup unit, for acquiring a difference image based on both images, and for detecting a retroreflective target from the object to be measured based on a relationship between the difference image and a detected intensity of reflected lights of a plurality of wavelengths detected from the difference image, and a distance data processing unit for calculating a distance to the target based on a received light signal from the light receiving element and for calculating a three-dimensional data of the object to be measured based on a calculated distance and a detection signal from the angle detector, wherein a position of the three-dimensional measuring device with respect to the target is calculated based on the calculated distance to the target and the projecting direction of the distance measuring light detected by the angle detector.

Also, the invention provides the three-dimensional measuring system as described above, wherein the target has an optical property of selectively reflecting a monochromatic light of a predetermined wavelength, and the illumination light contains at least a monochromatic light of the predetermined wavelength and another monochromatic light with a complementary color to the monochromatic light, and the image data processing unit judges a hue of the reflected light based on a relationship between light intensities in a reflected illumination light having a plurality of wavelengths and detects the target based on the hue.

Further, the invention provides the three-dimensional measuring system as described above, wherein the target has an optical property of selectively reflecting a monochromatic light of a predetermined wavelength, and the illumination light source unit separately irradiates a monochromatic light with a complementary color to the target and a monochromatic light with an identical color to the target, and the image data processing unit detects the target from two acquired difference images based on a difference between light intensities.

Also, the invention provides the three-dimensional measuring system as described above, wherein the target has a reflective sheeting, and the reflective sheeting has a first pattern area capable of reflecting a monochromatic light of a predetermined wavelength and a second pattern area capable of reflecting another monochromatic light complementary to the monochromatic light.

According to the present invention, the three-dimensional measuring device comprises a light source unit for generating a distance measuring light, a light projecting optical unit for projecting the distance measuring light from the light source unit on a distance measuring optical axis, a light receiving optical unit for receiving a reflected light from an object to be measured, a light receiving element for converting the reflected light condensed by the light receiving optical unit into an electric signal, a scanning unit for scanning the distance measuring light over the object to be measured, an angle detector for detecting an projecting direction of the distance measuring light scanned by the scanning unit, an illumination light source unit for projecting an illumination light having a plurality of wavelengths, an image pickup unit for acquiring two-dimensional images of the plurality of wavelengths and a control arithmetic unit, wherein the control arithmetic unit comprises a distance data processing unit for controlling a drive of the scanning unit, for calculating a distance to the object to be measured based on a received light signal from the light receiving element, and for calculating a three-dimensional data of the object to be measured based on a calculated distance and a detection signal from the angle detector and an image data processing unit for acquiring an image illuminated with the illumination light source unit and an unilluminated image by the image pickup unit, for acquiring a difference image based on both images, for detecting a retroreflective target based on the difference image and a detected intensity of a reflected light having a plurality of wavelengths detected from the difference image, and for calculating a position of the target. As a result, since it is not necessary to scan the distance measuring light for the detection of the target, a processing time can be shortened and an efficiency of an operation can be improved, and also, since an image pickup unit for tracking an image is not required, a device can be simplified and a manufacturing cost can be reduced.

Also, according to the present invention, based on a light intensity distribution of an image acquired from the difference image of the images acquired by the image pickup unit, target candidates are detected, and the target is detected based on a light intensity relationship between the target candidates in the plurality of wavelengths. As a result, since it is not necessary to scan the distance measuring light for the detection of the target, a processing time can be shortened and an efficiency of an operation can be improved.

Further, according to the present invention, the image pickup unit has a light receiving element sensitive to a blue, a green and a red, and the illumination light source unit irradiates a white light or a light including a plurality of monochromatic lights, and the image data processing unit judges a hue of the reflected light based on a ratio of each color in an acquired difference image and detects the target based on the hue. As a result, even if a plurality of the reflected lights is detected, a false detection of the target can be avoided.

Also, according to the present invention, the illumination light source unit irradiates a plurality of monochromatic lights, and the image data processing unit judges a hue of the reflected light based on a ratio of light quantities and an intensity between a plurality of difference images acquired by projecting the plurality of monochromatic lights and detects the target based on the hue. As a result, even if a plurality of the reflected lights is detected, a false detection of the target can be avoided.

Further, according to the present invention, the image pickup unit has a light receiving element sensitive to a blue, a green and a red, and the illumination light source unit irradiates a white light or a light including a plurality of monochromatic lights and at least one monochromatic light, and the image data processing unit judges a hue of the reflected light based on a ratio of each color in an acquired difference image projected with the white light and detects the target, and based on a difference image projected with the monochromatic light, also discriminate a white background light which varies on a time-series basis. As a result, even if a plurality of the reflected lights are detected, a false detection of the target can be avoided, and also a background light in a difference due to a difference in image acquisition time such as a sky seen through branches and leaves waving in a wind can be discriminated.

Also, according to the present invention, the target has an optical property of selectively reflecting a monochromatic light of a predetermined wavelength, and the illumination light source unit irradiates a monochromatic light with an identical color to the target and a monochromatic light with a complementary color to the target, and the image data processing unit detects the target from two acquired difference images based on a difference between received light intensities. As a result, in a case where a reflected light exists in one image while the reflected light does not exist in the other image, the reflected light can be discriminated as the target, and the reflected light can be detected reliably without judging the hue.

Further, according to the present invention, the illumination light source unit has a light emitting source coaxially aligned with respect to an optical center axis of the image pickup unit. As a result, a distance measuring optical axis can easily be aligned with a center of the target.

Also, according to the present invention, the illumination light source unit has a plurality of light emitting sources point-symmetrically disposed with respect to an optical center axis of the image pickup unit. As a result, a distance measuring optical axis can easily be aligned with a center of the target.

Further, according to the present invention, for the predetermined target, the control arithmetic unit acquires a plurality of difference images by the image pickup unit, while changing an image pickup direction at an angle smaller than a pixel pitch with the scanning unit, and by superimposing the difference images based on an angle from the angle detector, a detection accuracy of the reflected light is improved. As a result, in a case where the target is in a long distance and a detection of a light spot in the difference image is difficult, a detection accuracy of the light spot can be improved.

Also, according to the present invention, a wavelength selector capable of selecting a wavelength of a light entering the image pickup unit is included. As a result, if the only an invisible light is allowed to transmit through the wavelength selector, a background light can be reduced and the target can be detected.

Further, according to the present invention, the three-dimensional measuring system comprises a three-dimensional measuring device installed at an arbitrary position and a target installed at a known position, comprising the three-dimensional measuring device including a light source unit for generating a distance measuring light, a light projecting optical unit for projecting the distance measuring light from the light source unit on a distance measuring optical axis, a light receiving optical unit for receiving a reflected light from an object to be measured, a light receiving element for converting the reflected light condensed by the light receiving optical unit into an electric signal, a scanning unit for scanning the distance measuring light over the object to be measured, an angle detector for detecting an projecting direction of the distance measuring light scanned by the scanning unit, an illumination light source unit for irradiating an illumination light having a plurality of wavelengths, an image pickup unit for acquiring two-dimensional images of the plurality of wavelengths, an image data processing unit for acquiring an image illuminated with the illumination light source unit and an unilluminated image by the image pickup unit, for acquiring a difference image based on both images, and for detecting a retroreflective target from the object to be measured based on a relationship between the difference image and a detected intensity of reflected lights of a plurality of wavelengths detected from the difference image, and a distance data processing unit for calculating a distance to the target based on a received light signal from the light receiving element and for calculating a three-dimensional data of the object to be measured based on a calculated distance and a detection signal from the angle detector, wherein a position of the three-dimensional measuring device with respect to the target is calculated based on the calculated distance to the target and the projecting direction of the distance measuring light detected by the angle detector. As a result, the target can easily be detected by a simple data processing, and a position of the three-dimensional measuring device with respect to the target can be calculated in a short time.

Also, according to the present invention, the target has an optical property of selectively reflecting a monochromatic light of a predetermined wavelength, and the illumination light contains at least a monochromatic light of the predetermined wavelength and another monochromatic light with a complementary color to the monochromatic light, and the image data processing unit judges a hue of the reflected light based on a relationship between light intensities in a reflected illumination light having a plurality of wavelengths and detects the target based on the hue. As a result, a false detection of the target can be avoided.

Further, according to the present invention, the target has an optical property of selectively reflecting a monochromatic light of a predetermined wavelength, and the illumination light source unit separately irradiates a monochromatic light with a complementary color to the target and a monochromatic light with an identical color to the target, and the image data processing unit detects the target from two acquired difference images based on a difference between light intensities. As a result, in a case where a reflected light exists in one image while the reflected light does not exist in the other image, the reflected light can be discriminated as the target, and the reflected light can be detected reliably without judging the hue.

Also, according to the present invention, the target has a reflective sheeting, and the reflective sheeting has a first pattern area capable of reflecting a monochromatic light of a predetermined wavelength and a second pattern area capable of reflecting another monochromatic light complementary to the monochromatic light. As a result, a detection accuracy of the target can be further improved.

BRIEF DESCRIPTION OF THE DRAWINGS

FIG. 3 is a block diagram showing a configuration of the three-dimensional laser scanner.

FIG. 4A shows an original image in which a target is imaged together with a background, and FIG. 4B shows a difference image acquired by subtracting an unilluminated image from an illuminated image.

FIG. 5A is a front view, and FIG. 5B is a plan view.

FIG. 6A is a front view, and FIG. 6B is a plan view.

DETAILED DESCRIPTION OF THE PREFERRED EMBODIMENT

Description will be given below on embodiments of the present invention by referring to the attached drawings.

First, referring to FIG. 1, description will be given on general features of a three-dimensional measuring system according to an embodiment of the present invention.

Figure 1:
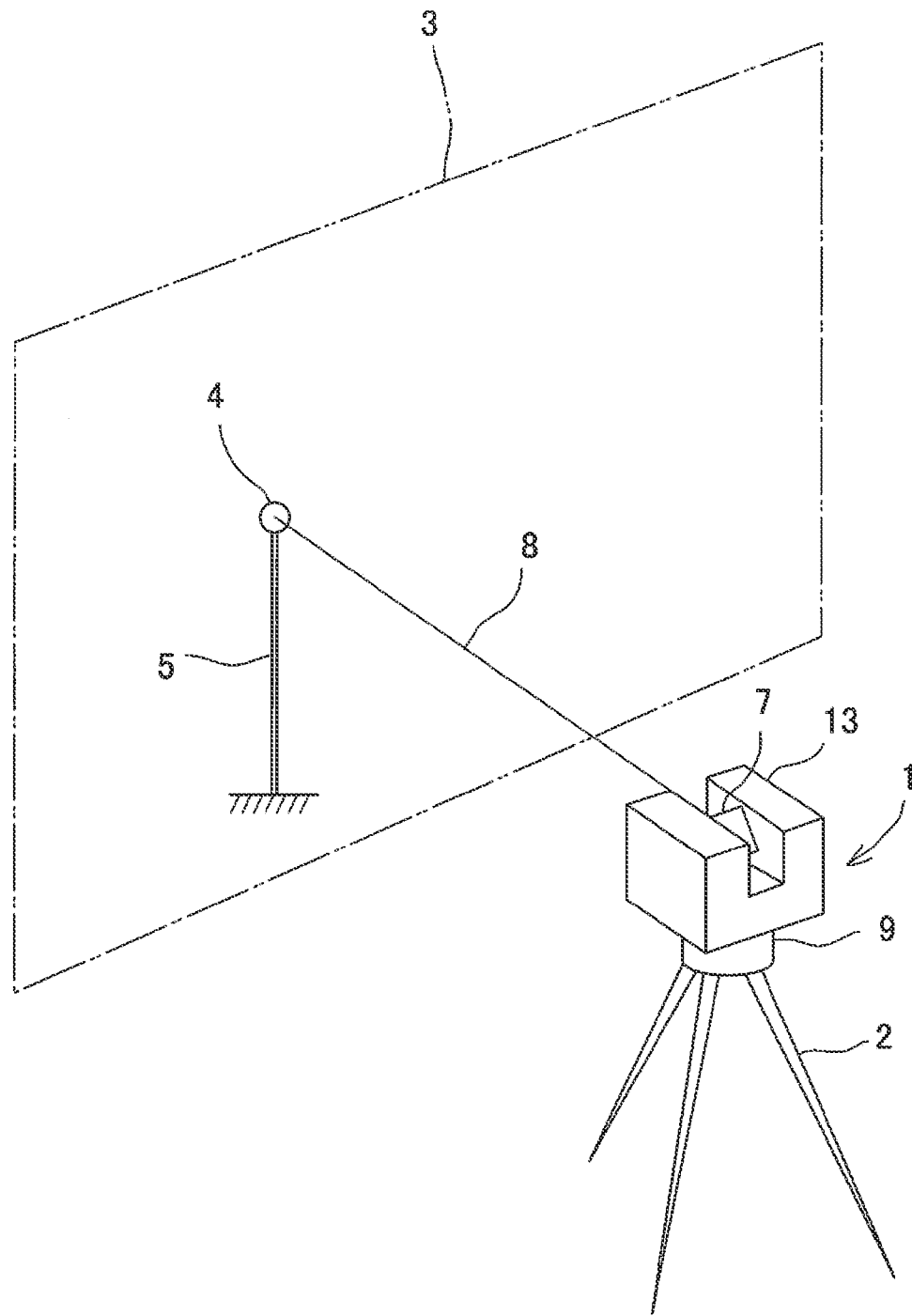
FIG. 1 is a perspective view showing a three-dimensional laser scanner, which is one example of a three-dimensional measuring device according to an embodiment of the present invention, and a target installed at a known position.

In FIG. 1, reference numeral 1 represents a three-dimensional measuring device, e.g. a three-dimensional laser scanner.

In a measurement range 3 specified, a target 4 is installed via a required support member such as a pole or a tripod (in this figure, a pole 5 is shown). A position where the pole 5 is installed and a height of the target 4 are known, and the three-dimensional position of the target 4 is known. The target 4 is retroreflective, and for example, a corner cube or a reflective sheeting can be employed.

The three-dimensional laser scanner 1 is installed via a tripod 2. Also, the three-dimensional laser scanner 1 is horizontally rotatable and has a scanning mirror 7 which rotates in a vertical plane via a vertical rotary shaft and is configured to irradiate a distance measuring light 8 via the scanning mirror 7. Through cooperative operation of the horizontal rotation of the three-dimensional laser scanner 1 and the vertical rotation of the scanning mirror 7, the distance measuring light 8 can be scanned all over the measurement range 3. Further, by scanning the distance measuring light 8, a three-dimensional point cloud data in the measurement range 3 can be acquired. Further, by fixing the scanning mirror 7 toward the target 4 and projecting the distance measuring light 8 to a point, a three-dimensional position of the target 4 can be measured.

Next, referring to FIG. 2, description will be given on one example of the three-dimensional laser scanner 1 employed in the present embodiment.

Figure 2:
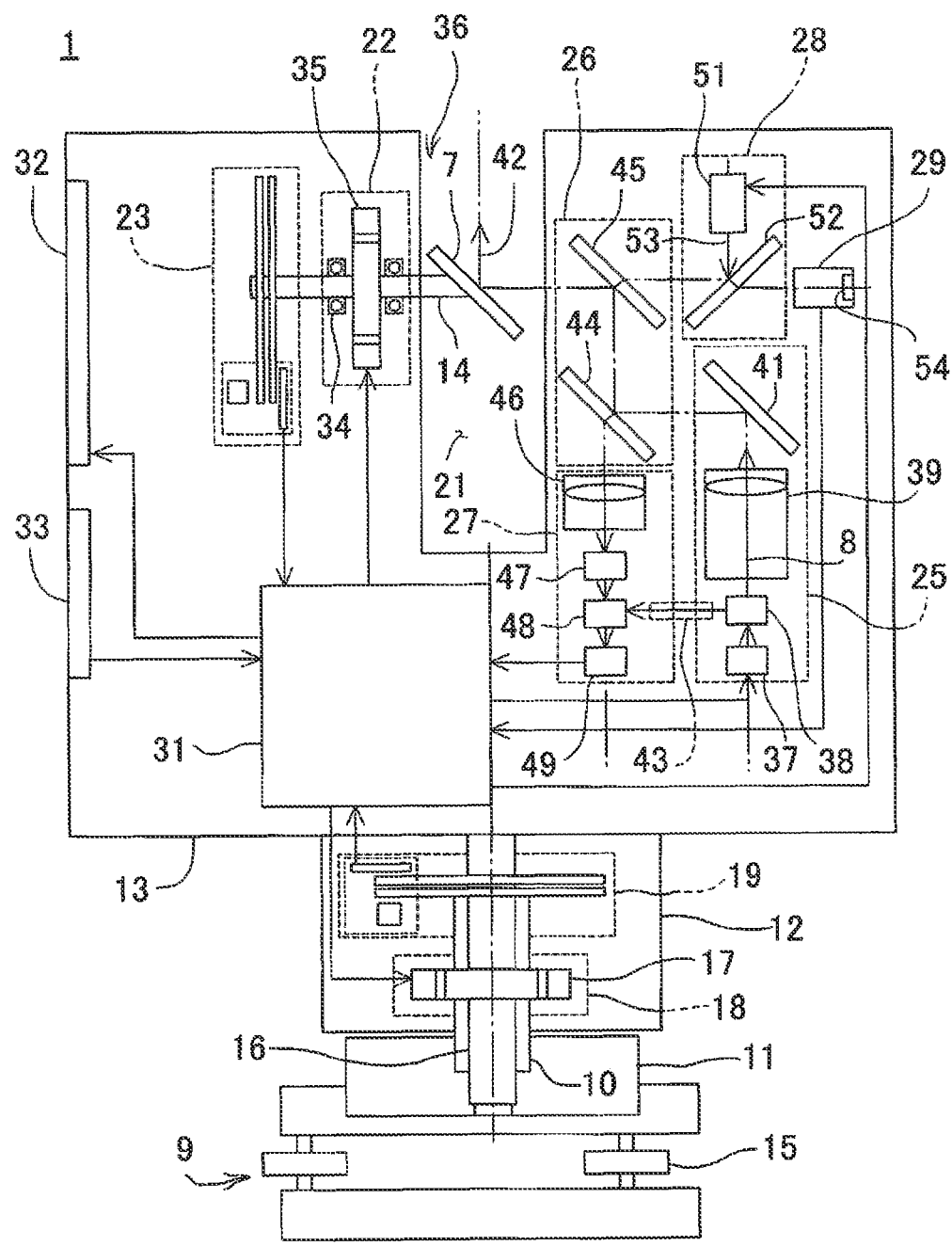
FIG. 2 is a schematic sectional elevational view of the three-dimensional laser scanner.

As shown in FIG. 2, the three-dimensional laser scanner 1 has a leveling unit 9 as attached to the tripod 2, a base member 11 as disposed on the leveling unit 9, a frame unit 13 as disposed on the base member 11 horizontally rotatably via a horizontal rotary unit 12, and the scanning mirror 7 disposed at the frame unit 13 vertically (vertical direction) rotatably around a vertical rotation shaft 14.

The leveling unit 9 has, for example, three adjusting screws 15. By adjusting the adjusting screws 15 so that an inclination sensor (not shown) disposed on the frame unit 13 detects a horizontal position, the leveling unit 9 can be leveled.

The horizontal rotary unit 12 has a horizontal rotation shaft 16 which is supported rotatably and vertically by the base member 11 via a bearing 10. The frame unit 13 is supported by the horizontal rotation shaft 16, and the frame unit 13 rotates together with the horizontal rotation shaft 16.

In the horizontal rotary unit 12, a horizontal driving unit 18 including a horizontal drive motor 17 and a horizontal angle detector (e.g. an encoder) 19 for detecting a rotation angle of the horizontal rotation shaft 16 are accommodated. By the horizontal drive motor 17, the frame unit 13 is rotated around the horizontal rotation shaft 16, and a rotation angle of the horizontal rotation shaft 16 with respect to the base member 11, i.e. the rotation angle of the frame unit 13 can be detected by the horizontal angle detector 19.

Also, a detection result (horizontal angle) of the horizontal angle detector 19 is input to a control arithmetic unit 31 (to be described later), and based on the detection result, a driving of the horizontal drive motor 17 is controlled by the control arithmetic unit 31.

In the frame unit 13, a recess 21 is formed at the center, and spaces are formed at the right and left sides of the recess 21. In one space (the left space in the figure), a vertical driving unit 22 and a vertical angle detector 23 are accommodated. In the other space (the right space in the figure), a distance measuring light emitter 25, a common optical path unit 26, a distance measuring unit 27, an illumination light emitter 28, an image pickup unit 29 and so on are accommodated, and in required positions inside the frame unit 13, the control arithmetic unit 31 and so on are accommodated. Further, in required positions of the frame unit 13, a display unit 32 and an operation unit 33 are disposed.

The vertical rotation shaft 14 is rotatably supported by the frame unit 13 via a bearing 34. One end of the vertical rotation shaft 14 projects into the recess 21, and at the projecting end of the vertical rotation shaft 14, the scanning mirror 7 is disposed at an angle of 45 degrees with respect to the shaft center of the vertical rotation shaft 14. The scanning mirror 7 is supported by the vertical rotation shaft 14 inside the recess 21 and rotates vertically around the vertical rotation shaft 14.

The vertical driving unit 22 has a vertical drive motor 35. It is so designed that the vertical rotation shaft 14 is rotated by the vertical drive motor 35, and the scanning mirror 7 is rotated by the vertical drive motor 35 via the vertical rotation shaft 14. It is noted that the vertical rotation shaft 14, the scanning mirror 7, the vertical drive motor 35 and so on constitute a scanning unit 36.

The vertical rotation shaft 14 is provided with the vertical angle detector 23, e.g. an encoder, and a rotation angle of the vertical rotation shaft 14 with respected to the frame unit 13 is detected by the vertical angle detector 23. It is so designed that a detection result (vertical angle) is input to the control arithmetic unit 31, and a drive of the vertical drive motor 35 is controlled by the control arithmetic unit 31 based on the detection result.

The distance measuring light emitter 25 has a distance measuring light source unit 37, an optical path splitting member 38 such as a half mirror or a beam splitter, a light projecting optical unit 39 comprising an object lens and so on, and a mirror 41. The distance measuring light source unit 37 is, for example, a semiconductor laser and emits a pulsed laser beam of an invisible infrared light as the distance measuring light 8 on a distance measuring optical axis 42. It is so designed that the distance measuring light source unit 37 is controlled by the control arithmetic unit 31 so that the pulsed laser beam is emitted under required conditions, e.g. at a required light intensity and at a required pulse interval and so on.

A part of the distance measuring light 8 emitted from the distance measuring light source unit 37 passes through the optical path splitting member 38 and enters the mirror 41 via the light projecting optical unit 39 and is reflected from the mirror 41 and is led to the common optical path unit 26. Meanwhile, the rest of the distance measuring light 8 is reflected from the optical path splitting member 38 as an internal reference light and is led to the distance measuring unit 27 via an internal reference optical path 43 which will be described below.

The common optical path unit 26 has a first beam splitter 44 and a second beam splitter 45. The distance measuring light 8 reflected from the mirror 41 is reflected from the first beam splitter 44 and the second beam splitter 45 in order and after reflecting by the second beam splitter 45, is led to the scanning mirror 7. Meanwhile, the distance measuring light 8 passing through the first beam splitter and the second beam splitter 45 is absorbed by an antireflective member not shown in the figure.

The scanning mirror 7 is a deflecting optical element, and it is so designed that the scanning mirror 7 deflects the horizontally entering distance measuring light 8 at a right angle, and horizontally deflects a reflected distance measuring light entering the scanning mirror 7 toward the second beam splitter 45.

The distance measuring light 8 led to the scanning mirror 7 from the common optical path unit 26 is reflected by the scanning mirror 7 and projected on an objected to be measured (not shown in the figure). Further, as the scanning mirror 7 is rotated around the vertical rotation shaft 14, the distance measuring light 8 is projected in rotary irradiation in a vertical plane. Furthermore, as the horizontal rotary unit 12 rotates the frame unit 13 horizontally, the distance measuring light 8 is horizontally rotationally irradiated around the horizontal rotation shaft 16. Therefore, through cooperative operation of the vertical rotation of the scanning mirror 7 and the horizontal rotation of the frame unit 13, the distance measuring light 8 can scan the measurement range 3 all over.

A reflected distance measuring light reflected from the object to be measured, which exists in the measurement range 3, enters the scanning mirror 7 and is reflected from the scanning mirror 7 and enters the common optical path unit 26. The reflected distance measuring light is reflected by the second beam splitter 45 and then passes through the first beam splitter 44 and is led to the distance measuring unit 27.

The distance measuring unit 27 has a light receiving optical unit 46 comprising a condensing lens and so on, an optical path extension 47, an optical path coupler 48 and a light receiving element 49. It is so designed that the reflected distance measuring light passing through the first beam splitter 44 is led to the light receiving element 49 and also the internal reference light led through the internal reference optical path 43 is led to the light receiving element 49 via the optical path coupler 48.

The reflected distance measuring light passing through the first beam splitter 44 enters the light receiving optical unit 46 and is condensed by the light receiving optical unit 46 and enters the optical path extension 47. The reflected distance measuring light having passed through the optical path extension 47 is received by the light receiving element 49 via the optical path coupler 48. Also, a internal reference light having passed through the internal reference optical path 43 is received by the light receiving element 49 via the optical path coupler 48.

It is so designed that the reflected distance measuring light and the internal reference light are converted into a reflected distance measuring light electric signal and an internal reference light electric signal and are sent to the control arithmetic unit 31, and it is so designed that a distance to the object to be measured is determined based on a difference in time interval between the reflected distance measuring light electric signal and the internal reference light electric signal.

Based on the distance to the object to be measured as determined, a vertical angle detected by the vertical angle detector 23 and a horizontal angle detected by the horizontal angle detector 19, the coordinate value of the object to be measured is calculated. By recording the coordinate value of the object to be measured for every pulse, the point cloud data for all over the measurement range 3 or the object to be measured can be acquired. The horizontal angle detector 19 and the vertical angle detector 23 constitute an angle detector which detects a direction of the distance measuring optical axis 42.

The illumination light emitter 28 has an illumination light source unit 51 and a third beam splitter 52 disposed on the optical axis of the illumination light source unit 51. It is so designed that illumination light 53 emitted from the illumination light source unit 51 is deflected by the third beam splitter 52 and projected along an image pickup optical axis at a predetermined divergence.

The illumination light source unit 51 is designed to emit a white light, or emit monochromatic lights of a plurality of wavelengths. In a case where the monochromatic lights of a plurality of wavelengths are emitted, it may be configured such that a plurality of laser diodes or LEDs for emitting monochromatic lights of different wavelengths are provided and the individual laser diodes or LEDs illuminate separately or simultaneously. Further, the illumination light source unit 51 may be configured to emit a white light or at least one monochromatic light separately.

On an image pickup optical axis of the image pickup unit 29, the third beam splitter 52 and an image pickup element 54 are disposed, and it is so designed that the image pickup optical axis passing through the third beam splitter 52 coincides with the optical axis of the illumination light source unit 51. The image pickup element 54 outputs digital image signals and is, for example, a CCD or CMOS sensor and the like composed of an assembly of picture elements (pixels), and a position of each pixel in the image pickup element 54 can be specified.

From the illumination light emitter 28, the illumination light 53 with a predetermined divergence is emitted. It is so designed that as the illumination light 53 passes through the second beam splitter 45, an optical axis of the illumination light 53 is aligned with the distance measuring optical axis 42. The illumination light 53 is reflected by the scanning mirror 7, so the illumination light 53 is projected on the distance measuring optical axis 42 and is projected over an image pickup area of the image pickup unit 29.

Further, an illumination light 53 reflected from the image pickup area (hereinafter referred to as a reflected illumination light) enters the scanning mirror 7, and the reflected illumination light reflected by the scanning mirror 7 passes through the second beam splitter 45 and the third beam splitter 52, and is received by the image pickup element 54. It is so designed that a two-dimensional image can be acquired based on the image signal output from the image pickup element 54.

It is noted that the illumination light 53 may be irradiated all over the image pickup area or a part of the image pickup area.

Next, referring to FIG. 3, description will be given on a control system of the three-dimensional laser scanner 1.

The operation unit 33, the vertical angle detector 23, and the horizontal angle detector 19 are electrically connected to the control arithmetic unit 31, and angle detection signals from the vertical angle detector 23 and the horizontal angle detector 19 are input and by the operator's operation, signals from the control panel 33 is input to the control arithmetic unit 31.

The operator can set, from the operation unit 33, a condition required to start the measurement by the three-dimensional laser scanner 1, for example, set a measurement range, set a density of the point cloud data, or set an image pickup condition upon acquiring an image, and can enter a measurement start instruction or the like, and from the display unit 32, these conditions and instructions can be confirmed. It is noted that the operation unit 33 or the display unit 32 may be provided in the frame unit 13 or may be provided separately and independently and may permit a remote control through a signal transfer medium such as a radio or an infrared light and so on.

The control arithmetic unit 31 drives the distance measuring light source unit 37, the horizontal drive motor 17, the vertical drive motor 35 and the illumination light source unit 51 and also drives the display unit 32 which displays a status of the operation, a measurement result or the like. Further, the control arithmetic unit 31 is provided with an external storage device 56 such as a memory card or a HDD and so on. The external storage device 56 may be provided to the control arithmetic unit 31 fixedly or detachably.

Next, description will be given on general features of the control arithmetic unit 31.

The control arithmetic unit 31 comprises an arithmetic unit 57, typically represented by CPU, a storage unit 58, a distance measuring light emission driving unit 59 for controlling a light emission at the distance measuring light source unit 37, an illumination light emission driving unit 60 for controlling a light emitting of the illumination light source unit 51, the horizontal driving unit 18 for controlling a driving of the horizontal drive motor 17, the vertical driving unit 22 for controlling a driving of the vertical drive motor 35, a distance data processing unit 61 for processing a distance data acquired by the distance measuring unit 27, an image data processing unit 62 for processing a image data acquired by the image pickup unit 29 and so on.

The storage unit 58 stores programs such as a sequence program for performing a distance measurement, a measurement of a vertical angle, and a measurement of a horizontal angle, an arithmetic program for performing calculations such as a calculation for a distance measurement, a measurement data processing program for performing a processing of the measurement data, an image pickup program for controlling image pickup conditions of the image pickup unit 29, an image processing program for performing a image processing, a target detecting program for detecting a target from a processed image, and programs such as an image displaying program for displaying the data on the display unit 32, or a program for an integrated management of these programs, and further stores data such as a measurement data or a image data.

It is noted that functions of the distance data processing unit 61 and the image data processing unit 62 may be performed by the arithmetic unit 57, and in this case, the distance data processing unit 61 and the image data processing unit 62 can be omitted. Further, by individually providing the distance data processing unit 61 and the image data processing unit 62, a measurement of distance data and a measurement of image data may be performed simultaneously. In this case, a high-speed processing can be performed.

Further, the distance data processing unit 61 and the image data processing unit 62 may be provided separately. For example, a PC may be provided separately, and functions of the distance data processing unit 61 and the image data processing unit 62 may be performed by this PC. In this case, communication means may be provided in the three-dimensional laser scanner 1 and the PC respectively, and the distance data and the image data may be transmitted to the PC from the three-dimensional laser scanner 1, and a processing of the distance data and a processing of the image data may be performed by the PC. It is noted that as the communication means, a required communication means such as an optical communication, a radio communication or a LAN may be employed.

As described above, in order to measure an object to be measured with the three-dimensional laser scanner 1 and obtain coordinates of the object to be measured, an installation position of the three-dimensional laser scanner 1 has to be known. Therefore, in a case where the installation position of the three-dimensional laser scanner 1 is unknown, as a lead-up to the measurement, it is necessary to obtain the position of the three-dimensional laser scanner 1.

Following description will be given on a detection and a positional measurement of the target 4 by the three-dimensional laser scanner 1 for obtaining a position of the three-dimensional laser scanner 1. It is noted that in the following, the description will be given on a case where the illumination light source unit 51 emits a plurality of laser beams of different wavelengths and/or a white light as the illumination light 53.

First, the three-dimensional laser scanner 1 is installed at an arbitrary position, and the adjusting screws 15 are turned so that the inclination sensor (not shown) disposed on the frame unit 13 detects a horizontal position and the three-dimensional laser scanner 1 is leveled so as to have a horizontal position. Further, under the condition that the three-dimensional laser scanner 1 is leveled, the distance measuring optical axis 42 becomes horizontal at a reference position of the scanning mirror 7.

At this time, the position of the three-dimensional laser scanner 1 is unknown, and the target 4 such as a corner cube is installed at a known position via the pole 5. As the image pickup element 54, a color CCD or an image sensor and so on may be employed.

After the leveling is finished, the operator directs the three-dimensional laser scanner 1 toward the target 4 and starts a detection processing of the target 4. During the detection processing of the target 4, the scanning mirror 7 remains standstill in the reference position.

The illumination light source unit 51 is driven with the illumination light emission driving unit 60. By driving the illumination light source unit 51, the white illumination light 53 is projected toward an image pickup area via the scanning mirror 7, and an image, to which the white illumination light 53 (first illuminated image) is irradiated, is acquired by the image pickup unit 29, and the first illuminated image is stored in the storage unit 58.

Next, the illumination light source unit 51 is stopped by the illumination light emission driving unit 60, and an image, to which the white illumination light 53 (unilluminated image) is not irradiated, is acquired by the image pickup unit 29, and the unilluminated image is stored in the storage unit 58.

Figure 4A:
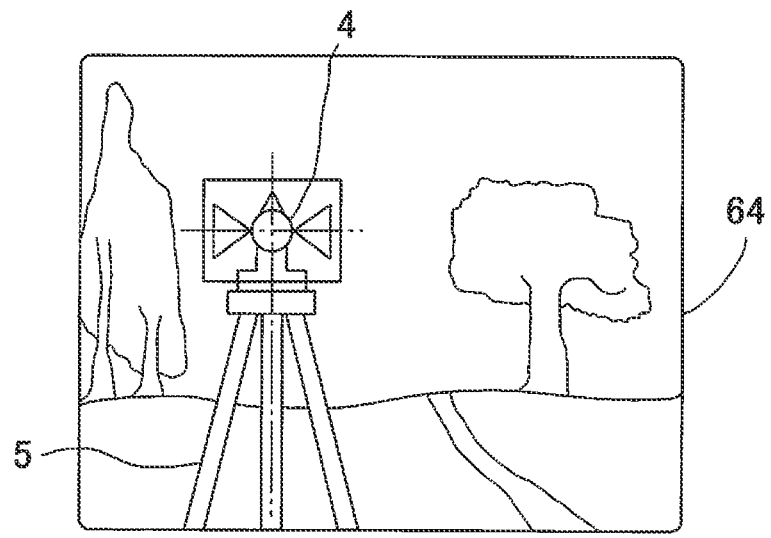
FIG. 4A and FIG. 4B are images acquired by an image pickup unit.

It is noted that both the first illuminated image and the unilluminated image are an normal original image 64 in which the background is imaged together with the target 4, as shown in FIG. 4A. In the original image 64, a retroreflected light from the target 4 appears as a light spot 65.

Figure 4B:
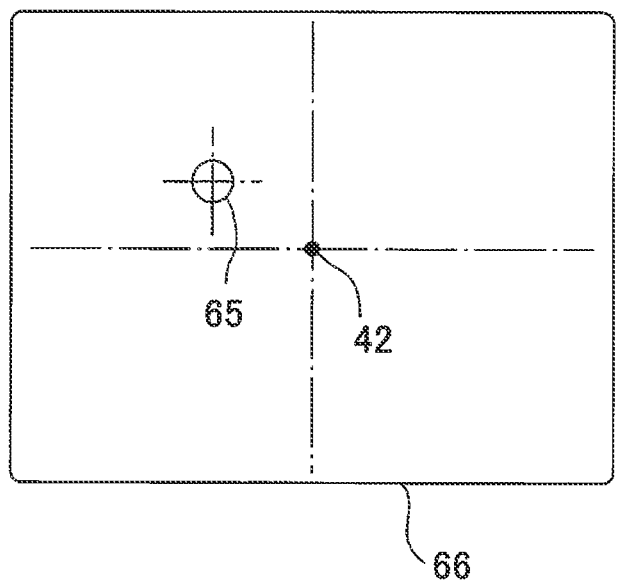

After the first illuminated image and the unilluminated image are acquired, then, in the image data processing unit 62, the unilluminated image is subtracted from the first illuminated image. By subtracting the unilluminated image, the background is removed from the original image 64. A first difference image 66 in which only the light spot 65 of a retroreflected light remains, as shown in FIG. 4B, is calculated, and the light spot 65 in the first difference image 66 is detected as the target 4.

It is noted that in the detection processing of the target 4, a retroreflective object other than the target 4 may also exist in the original image 64, and a plurality of light spots may exist in the first difference image 66.

In this case, in order to detect the light spot 65 due to the retroreflected light from the target 4 among a plurality of light spots, a following processing is performed.

When the image pickup element 54 is composed of a light receiving element sensitive to a blue, a green and a red, a hue of each light spot detected in the first difference image 66 can be judged according to the ratio of these colors, and the light spot 65 corresponding to the target 4 can be detected. Further, by giving the target 4 a property of selectively reflecting a predetermined wavelength, i.e. the target 4 has a predetermined color, the light spot 65 corresponding to the target 4 can be detected among candidates based on a judged result for the hue.

It is noted that in the above, the first illuminated image is acquired according to the white illumination light 53, and the candidates for the target 4 are detected based on the first illuminated image and the unilluminated image, and the target 4 is detected among the candidates based on the hue. However, as another embodiment, the illumination light 53 may be replaced by a plurality of types of monochromatic lights, e.g. two types of monochromatic lights, and two types of illuminated images may be acquired for each color with this illumination light 53, and based on the two types of illuminated images and the unilluminated image, the target may be detected.

Further, two types of illuminated images may be acquired by irradiating two types of monochromatic lights simultaneously and separating and extracting green components and red components out of signals from the light receiving element.

Following description will be given on another embodiment.

By using a monochromatic light with a predetermined wavelength, e.g. a pure green illumination light 53, an image as irradiated by the pure green illumination light 53 (second illuminated image) is acquired. Then, by using a monochromatic light of a color different from the pure green, e.g. a pure red illumination light 53, an image as irradiated by the pure red illumination light 53 (third illuminated image) is acquired, and the unilluminated image is further acquired.

When the plurality of illuminated images and the unilluminated image are acquired, the second illuminated image and the unilluminated image are compared and subtracted and a second difference image is calculated, and also the third illuminated image and the unilluminated image are compared and subtracted and a third difference image is calculated.

Here, for example, if the target 4 has an optical property of selectively reflecting a pure green light or if the target 4 is made of a green reflective sheeting and selectively reflects a pure green light, only the green component of the illumination light 53 is reflected by the target 4, and the light other than the green is reflected in an attenuated manner.

Accordingly, in a case where the illumination light 53 is a pure green light and the second difference image is calculated from the second illuminated image and the unilluminated image, a retroreflected light from the target 4 appears as the light spot 65 in the second difference image without any attenuation.

If the monochromatic light for acquiring the third illuminated image is a pure red light which is complementary to a pure green light, when the pure red light is irradiated, almost no reflection comes from the target 4, and the light spot 65 does not appear in the third difference image. Further, a reflected light from an object or a part having a red component is received in an attenuated state.

The second difference image and the third difference image are compared with each other by the image data processing unit 62. The hue can be judged by obtaining a ratio of light quantities and an intensity for the detected candidates for the target 4. Thus, the target 4 can be detected based on the judged hue.

It is noted that in a case where the pure green light is irradiated, the pure green light is reflected by the target 4 without much attenuation. In a case where the pure red light is irradiated, there is no reflected light from the target 4.

Therefore, by comparing the second difference image with the third difference image, in a case where the light spot 65 exists in the second difference image but the light spot 65 does not exist in the third difference image, the light spot 65 in the second difference image can be discriminated as the target 4, so that the light spot 65 can be detected reliably without the need to determine the hue.

It is noted that in another embodiment described above, the image pickup element 54 may be a monochrome photodetection sensor only sensitive to the brightness.

As a still another embodiment, the configurations described above may be combined, and the target 4 may be detected from a white light illuminated image for which a white light is employed as the illumination light 53, a monochromatic light illuminated image for which at least one monochromatic light, e.g. a pure red light is employed as the illumination light 53, and the unilluminated image.

From the white light illuminated image and the unilluminated image, a white light illuminated difference image is calculated. From the white light illuminated difference image, candidates for the target 4 are detected, and the target 4 is detected based on a hue. Further, a monochromatic light illuminated difference image is calculated based on the monochromatic light illuminated image and the unilluminated image. In a case where the pure red light is irradiated, a sunlight having passed through waving branches and leaves or a sunlight reflected from a surface of a river can be detected as a white background light. Therefore, by combining the monochromatic light illuminated difference image with the white light illuminated difference image, even if the white background light remains in the white light illuminated difference image because of a difference in acquisition time, the reflected light and the background light can be discriminated from each other, so it is possible to improve a detection accuracy of the target 4 which is retroreflective and colorless or has a given hue.

Further, in a case where a pattern is formed by the reflective sheeting, if a first pattern area capable of reflecting a monochromatic light of a certain wavelength and a second pattern area capable of reflecting another monochromatic light complementary to the monochromatic light are formed, different patterns can be obtained by switching the illumination light 53, so it becomes easier to detect the target 4.

Further, the target 4 has a property of selectively reflecting a wavelength and a white light is employed as the illumination light 53 and a plurality of wavelength selective filters having different transmission properties (e.g. a green light transmission filter and a red light transmission filter) are allowed to be individually detachably inserted into a light receiving optical path of the image pickup unit 29 and an entering reflected light is received for every wavelength through the wavelength selective filters, whereby the same effects can be obtained.

Figure 5A:
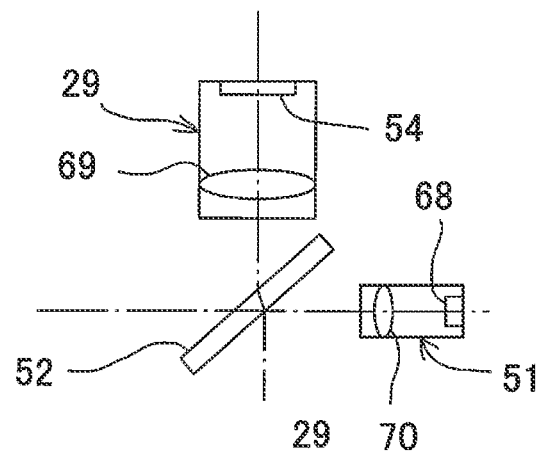
FIG. 5A and FIG. 5B are enlarged view of an essential portion of a positional relationship between an image pickup unit and an illumination light source unit according to an embodiment of the present invention.
Figure 5B:
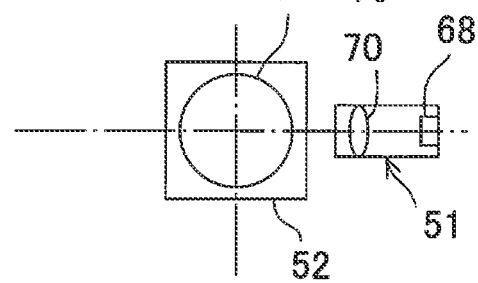

FIG. 5A and FIG. 5B are enlarged views of an essential portion showing one example of the illumination light emitter 28 and the image pickup unit 29 in the present embodiment.

The third beam splitter 52 is provided to align the optical axis of the illumination light source unit 51 with the image pickup optical axis of the image pickup unit 29. The image pickup unit 29 is disposed on the reflecting optical axis of the third beam splitter 52 and the only one illumination light source unit 51 is disposed on a transmitting optical axis of the third beam splitter 52. This arrangement is the same as described in the embodiment described above. It is noted that in the figures, 68 represents a light emitting source.

The image pickup unit 29 is configured by an image pickup lens 69 and the image pickup element 54. The illumination light source unit 51 is configured by an illumination lens 70 and the light emitting source 68.

Next, description will be given on an operation of aligning the center of the target 4 with the distance measuring optical axis 42.

In the illumination light source unit 51 according to FIG. 5A and FIG. 5B, the light spot 65 is detected as a single spot from the first difference image 66. Accordingly, in a case where the distance measuring optical axis 42 is aligned with a center of the target 4, a position of a peak intensity of the light spot 65 is obtained on the image pickup element 54, and the vertical drive motor 35 and the horizontal drive motor 17 are controlled by the vertical driving unit 22 and the horizontal driving unit 18 so that the position of the peak intensity coincides with a reference position, e.g. a center on the image pickup element 54. Whereby the distance measuring optical axis 42 can be aligned with the center of the target 4.

Figure 6A:
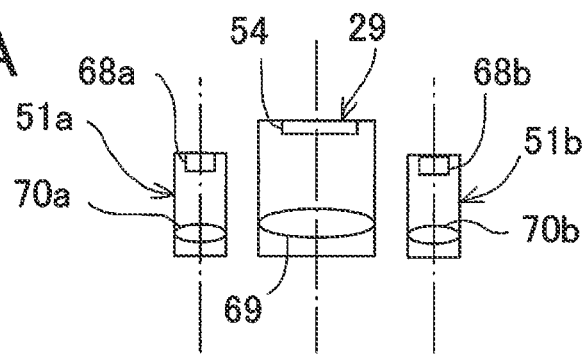
FIG. 6A and FIG. 6B are enlarged view of an essential portion of a positional relationship between an image pickup unit and an illumination light source unit according to another embodiment of the present invention.
Figure 6B:
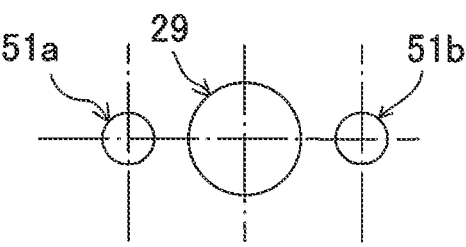

Meanwhile, FIG. 6A and FIG. 6B show another embodiment of the illumination light source unit 51.

In another embodiment shown in FIG. 6A and FIG. 6B, two illumination light source units 51a, 51b are disposed point-symmetrically with respect to a center of an optical axis of the image pickup unit 29. Optical axes of the illumination light source units 51a, 51b are parallel to the optical axis of the image pickup unit 29 (i.e. the distance measuring optical axis 42).

By providing the two illumination light source units 51, when the illumination light 53 is irradiated on the target 4 in a close range, two light spots 65, 65 can be detected in a difference image. A midpoint between peak intensities of the two light spots 65, 65 indicates a center of the target 4. Accordingly, by controlling the vertical drive motor 35 and the horizontal drive motor 17 by the vertical driving unit 22 and the horizontal driving unit 18 so that the midpoint between the peak intensities of the two light spots 65, 65 coincides with a reference position on the image pickup element 54, the distance measuring optical axis 42 can be aligned with the center of the target 4.

Further, in a case where the target 4 is in a long distance, a single light spot 65 is detected in the difference image. In this case, as in the case where the illumination light source unit 51 is single, the vertical drive motor 35 and the horizontal drive motor 17 are controlled by the vertical driving unit 22 and the horizontal driving unit 18 so that a position of a peak intensity of the light spot 65 coincides with the reference position on the image pickup element 54. Whereby the distance measuring optical axis 42 can be aligned with the center of the target 4.

It is noted that in a case where the target 4 installed in a long distance is imaged, a size of a light spot with respect to pixels 67 of the image pickup element 54 may become as small as about three pixels, and there may be a case where it is impossible to acquire a sufficient data to determine a peak position of the light spot 65.

Referring to FIG. 7 to FIG. 9 and FIG. 10, description will be given on a method of interpolating a data of light intensity distribution, from which a peak position of the light spot 65 is determined, and improving an accuracy of detecting the peak position of the light spot 65.

Figure 7A:
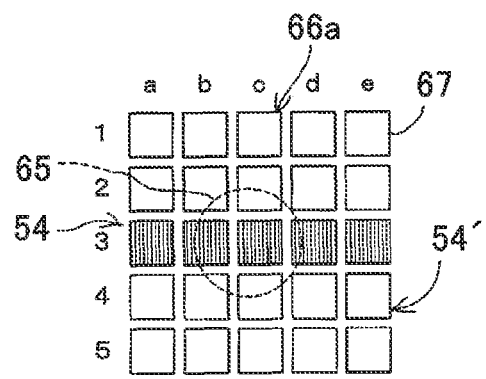
FIG. 7A is an enlarged view showing a relationship between a partial element and a light spot in a difference image.
Figure 7B:
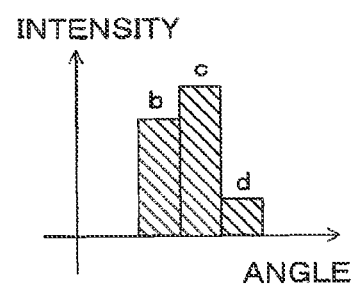
FIG. 7B is a graph showing a light intensity distribution of the light spot in the partial element.
Figure 8A:
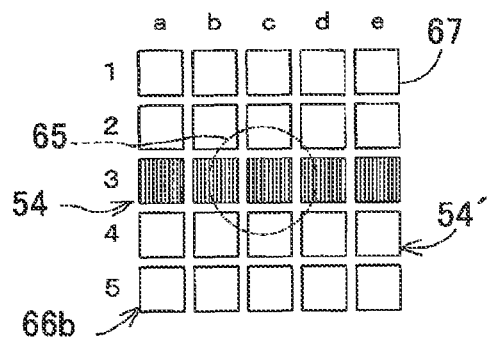
FIG. 8A is an enlarged view showing a relationship between a partial element and a light spot in a difference image.
Figure 8B:
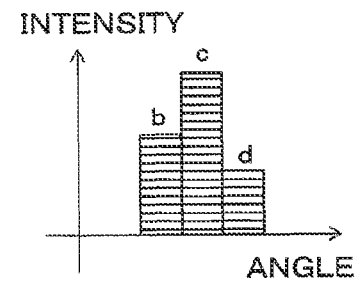
FIG. 8B is a graph showing a light intensity distribution of the light spot in the partial element.
Figure 9A:
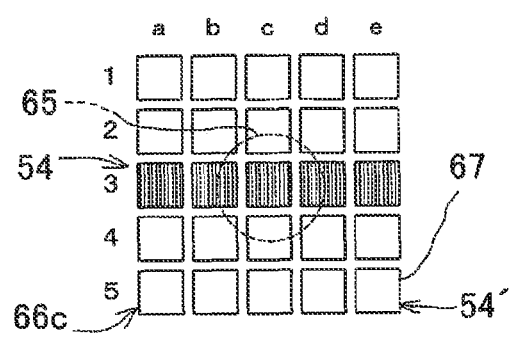
FIG. 9A is an enlarged view showing a relationship between a partial element and a light spot in a difference image.

FIG. 7 to FIG. 9 are drawings focusing on a partial element 54' (five rows (a-e) of pixels×five columns (1-5) of pixels) of the image pickup element 54. Also, in FIG. 7A, FIG. 8A, and FIG. 9A, the circle shown by a dotted line is the light spot 65. Difference images that can be acquired by the partial element 54' are referred as difference images 66a to 66c.

Here, in a case where the pixels of the third row in the difference images 66a to 66c are focused, a horizontal light intensity distribution of a light spot 65 as received by the pixels is expressed as a bar chart, as shown in FIG. 7B. Since the light spot 65 is as small as about three pixels, only three data can be acquired. Based on angle signals from the vertical angle detector 23 and the horizontal angle detector 19, the vertical drive motor 35 and the horizontal drive motor 17 are driven by the vertical driving unit 22 and the horizontal driving unit 18, and an image pickup direction is horizontally changed by an angle smaller than an angle corresponding to one pixel of the image pickup element 54 (e.g. one third of an angle of view between the pixel 67b3 and the pixel 67c3), and the image is then taken. Thus, between the pixels 67b3 and 67c3, a plurality of difference images, e.g. two difference images 66b, 66c as shown in FIG. 8A and FIG. 9A is acquired. This means that it is possible to obtain a same result as in a case where pixels are arranged by one third of the shown pixel pitch.

Figure 9B:
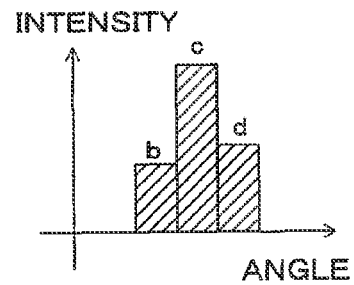
FIG. 9B is a graph showing a light intensity distribution of the light spot in the partial element.
Figure 10:
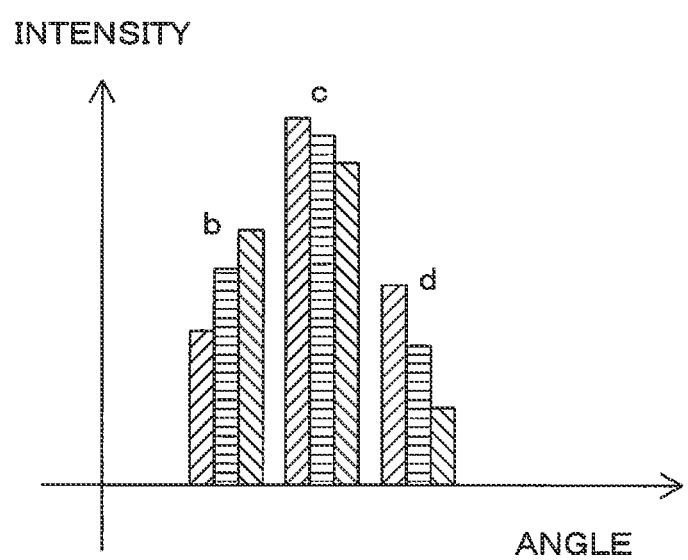
FIG. 10 is a graph showing a light intensity distribution of a light spot interpolated based on an original image and a difference image.

By rotating in the horizontal direction by one third of the pixel pitch, the difference images 66b, 66c can be acquired, and also with respect to the difference images 66b, 66c, as shown in FIG. 8B and FIG. 9B, it is possible to individually obtain the horizontal light intensity distribution of the light spot 65 consisting of three data. By arranging a light intensity distribution obtained from the difference image 66a and the light intensity distributions obtained from the difference images 66b, 66c associated with an image pickup angle, as shown in FIG. 10, a horizontal light intensity distribution of the light spot 65 consisting of nine data can be obtained, so the horizontal peak position of the light spot 65 can be detected with high accuracy.

In addition, when the pixels of the c column are similarly focused, and the image pickup direction is vertically changed by an angle smaller than the angle corresponding to one pixel pitch of the image pickup element 54 and images are taken, and a plurality of difference images is acquired. Then, by arranging the light intensity distribution obtained from the previously taken images and a light intensity distributions obtained from difference images associated with the image pickup angle, a data for determining the peak position of the light spot 65 can be interpolated, so the vertical peak position of the light spot 65 can be detected with high accuracy.

The data is interpolated and based on the horizontal and vertical peak positions of the light spot 65, the vertical drive motor 35 and the horizontal drive motor 17 are controlled by the vertical driving unit 22 and the horizontal driving unit 18, whereby the distance measuring optical axis 42 can be aligned with the center of the target 4.

Further, instead of changing the image pickup direction horizontally and vertically, the difference image may be acquired by changing the image pickup direction diagonally. By changing the image pickup direction diagonally, the horizontal and vertical light intensity distributions of the light spot 65 can be obtained simultaneously, so the horizontal and vertical data can be interpolated at once.

Further, instead of interpolating the data and determining the peak position of the light spot 65, a general position may be obtained from the image pickup element 54, and a scanning area may be set as a center at the general position. The scanning is performed over the scanning area by the distance measuring light 8, a central position of the target 4 is determined based on a distribution result of a reflection intensity. Thus, the distance measuring optical axis 42 may be aligned with the center of the target 4.

After a vertical angle and a horizontal angle, with which the distance measuring optical axis 42 is kept in alignment with the center of the target 4, are stored in the storage unit 58, a distance to the target 4 is measured with the three-dimensional laser scanner 1.

The distance measuring light source unit 37 is driven by the distance measuring light emission driving unit 59, and with the distance measuring optical axis 42 kept in alignment with the center of the target 4, a pulsed laser beam is emitted from the distance measuring light source unit 37 as the distance measuring light 8.

A part of the distance measuring light 8 is split by the optical path splitting member 38 toward the internal reference optical path 43. The rest of the distance measuring light 8 is collimated into parallel luminous fluxes through the light projecting optical unit 39. Then, after the rest of the distance measuring light 8 is reflected by the mirror 41, the first beam splitter 44 and the second beam splitter 45, the distance measuring light 8 is deflected at a right angle by the scanning mirror 7 and is projected toward the center of the target 4.

A reflected distance measuring light reflected from the target 4 enters the scanning mirror 7, and is deflected at a right angle by the scanning mirror 7, and is reflected by the second beam splitter 45, and passes through the first beam splitter 44. Then, the reflected distance measuring light is condensed by the light receiving optical unit 46. The reflected distance measuring light condensed by the light receiving optical unit 46 passes through the optical path extension 47 and enters the light receiving element 49 via the optical path coupler 48. Meanwhile, the distance measuring light 8 split by optical path splitting member 38 (internal reference light) also enters the light receiving element 49 via the internal reference optical path 43 and the optical path coupler 48.

The distance measuring light 8 and the reflected distance measuring light are converted into a distance measuring light electric signal and a reflected distance measuring light electric signal and sent to the control arithmetic unit 31. In the control arithmetic unit 31, a time interval between the distance measuring light electric signal and the reflected distance measuring light electric signal is determined by the distance data processing unit 61, and a distance to the target 4 is calculated based on the determined time interval. The calculated distance to the target 4 is stored in the storage unit 58.

By obtaining the vertical angle and the horizontal angle of the three-dimensional laser scanner 1 with respect to the target 4 and the distance to the target 4, a position of the three-dimensional laser scanner 1 with respect to the target 4 can be determined, so the position of the three-dimensional laser scanner 1 can become known.

As described above, in the present embodiment, an operation of taking images is performed by the three-dimensional laser scanner 1 directed toward the target 4 and the target 4 is detected by a simple image processing, and a measurement point of the target 4 is aligned with a distance measuring optical axis 42, as a result, it is not necessary to scan a distance measuring light for detecting the target 4 or to scan the distance measuring light over a wide range, and a processing time can be shortened and an efficiency of an operation can be improved.

Further, since an acquisition of a panoramic image or a moving image and a detection of the target 4 can be performed by the same image pickup unit 29, a device can be simplified and a manufacturing cost can be reduced.

Further, in the present embodiment, when detecting the target 4, a hue of the target 4 can be judged, so a light spot reflected from a reflecting plate of a traffic sign, a car or the like and a light spot reflected from the target 4 can be distinguished from each other, and a false detection of the target 4 can be avoided.

It is noted that in the present embodiment, the target 4 is detected from a difference image based on an illuminated image acquired under a condition where the monochromatic illumination light 53 is irradiated from the illumination light source unit 51 and based on an unilluminated image acquired under a condition where the illumination light 53 is not irradiated from the illumination light source unit 51, however, another configuration may be adopted as long as the target 4 can be detected.

For example, the illumination light source unit 51 is replaced by a light source which irradiates a near-infrared light as the illumination light 53, and the image pickup unit 29 is provided with a wavelength selector which freely selects and transmits a wavelength of a light entering the image pickup element 54.

The wavelength selector is, for example, a filter capable of switching between a portion which transmits a visible light and a portion which transmits a near-infrared light, and when a panoramic image or a moving image is to be acquired, the portion which transmits a visible light is used, and when the target 4 such as a retroreflective corner cube is to be detected, the portion which transmits only a near-infrared light is used, so that a background light in an acquired image can be reduced.

Figure 11:
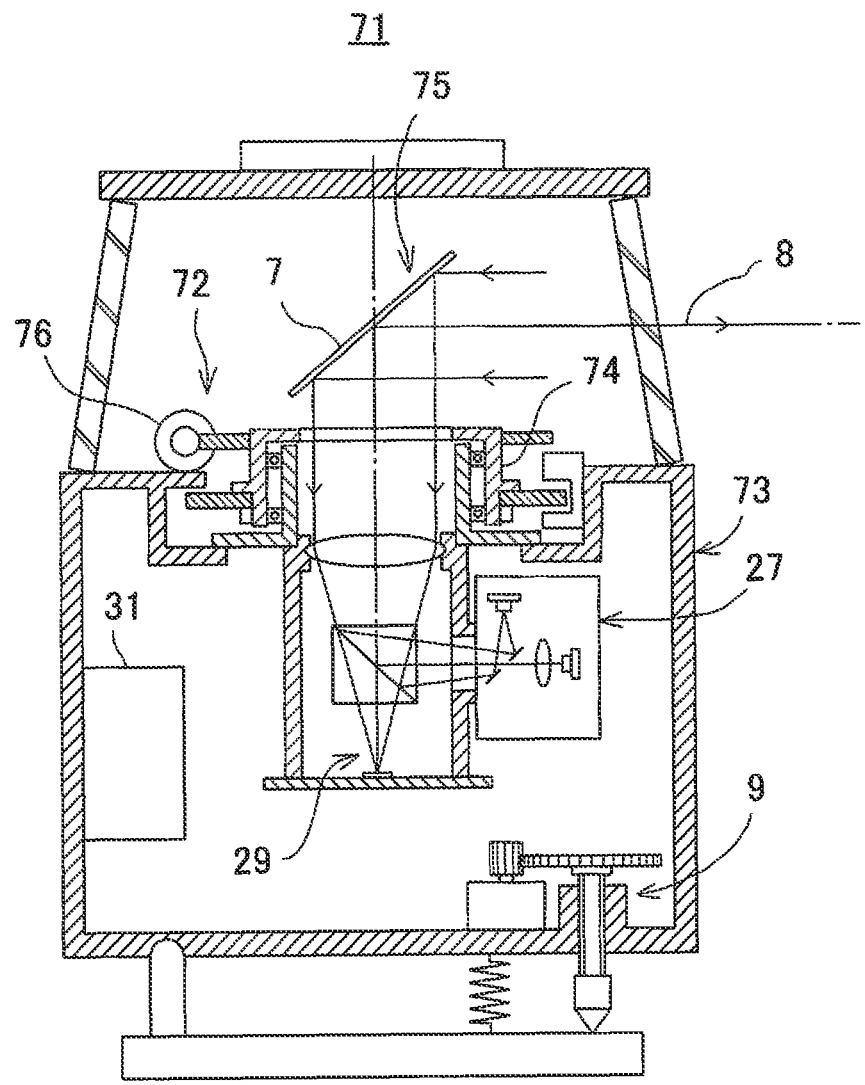
FIG. 11 is a schematic sectional elevational view of another three-dimensional laser scanner to which the target detection according to an embodiment of the present invention is applicable.

It is noted that a detection of the target 4 in the present embodiment is applicable not only to the three-dimensional laser scanner 1 but also to a three-dimensional laser scanner 71 shown in FIG. 11.

The three-dimensional laser scanner 71 is composed mainly of a measuring device main unit 73 accommodating a leveling unit 9, a rotary mechanism 72, a distance measuring unit 27, an image pickup unit 29, a control arithmetic unit 31 and so on. A rotary base 74 is mounted rotatably on an upper portion of the measuring device main unit 73, and a rotary projecting unit 75 is mounted on the upper portion of the rotary base 74.

The rotary projecting unit 75 has a mirror holder (not shown) attached to the rotary base 74 and a scanning mirror 7 rotatably mounted on the mirror holder. The scanning mirror 7 is designed to rotate vertically around a horizontal shaft by a vertical rotary motor (not shown) and also rotate horizontally by a horizontal rotary motor 76 of the rotary mechanism 72, together with the rotary base 74.

A distance measuring light 8 projected from the distance measuring unit 27 is led to the scanning mirror 7 and reflected by the scanning mirror 7 toward an object to be measured. Further, a reflected distance measuring light reflected from the object to be measured is reflected from the scanning mirror 7 and is partially led to the image pickup unit 29, and an image can be acquired, and also the rest is led to the distance measuring unit 27, and a distance to the object to be measured is measured.

Through cooperative operation of a vertical rotation of the scanning mirror 7 and a horizontal rotation of the rotary base 74, the distance measuring light 8 can be scanned over total circumference within a predetermined vertical range. Further, by scanning the distance measuring light 8, a three-dimensional point cloud data of the object to be measured can be acquired. Further, by fixing the scanning mirror 7 toward the target 4 (see FIG. 1) and projecting the distance measuring light 8 to a point, a three-dimensional position of the target 4 can be measured.

The invention claimed is:

1. A three-dimensional measuring device comprising, a light source unit for generating a distance measuring light, a light projecting optical unit for projecting said distance measuring light from said light source unit on a distance measuring optical axis, a light receiving optical unit for receiving a reflected light from an object to be measured, a light receiving element for converting said reflected light condensed by said light receiving optical unit into an electric signal, a scanning unit for scanning said distance measuring light over said object to be measured, an angle detector for detecting an projecting direction of said distance measuring light scanned by said scanning unit, an illumination light source unit for projecting an illumination light having a plurality of wavelengths, an image pickup unit for acquiring two-dimensional images of said plurality of wavelengths and a control arithmetic unit, wherein said control arithmetic unit comprises a distance data processing unit for controlling a drive of said scanning unit, for calculating a distance to said object to be measured based on a received light signal from said light receiving element, and for calculating a three-dimensional data of said object to be measured based on a calculated distance and a detection signal from said angle detector and an image data processing unit for acquiring an image illuminated with said illumination light source unit and an unilluminated image by said image pickup unit, for acquiring a difference image based on both images, for detecting a retroreflective target based on said difference image and a detected intensity of a reflected light having a plurality of wavelengths detected from said difference image, and for calculating a position of said target.

2. A three-dimensional measuring device according to claim 1, wherein based on a light intensity distribution of an image acquired from said difference image of said images acquired by said image pickup unit, target candidates are detected, and said target is detected based on a light intensity relationship between said target candidates in said plurality of wavelengths.

3. A three-dimensional measuring device according to claim 1, wherein said image pickup unit has a light receiving element sensitive to a blue, a green and a red, and said illumination light source unit irradiates a white light or a light including a plurality of monochromatic lights, and said image data processing unit judges a hue of said reflected light based on a ratio of each color in an acquired difference image and detects said target based on said hue.

4. A three-dimensional measuring device according to claim 1, wherein said illumination light source unit irradiates a plurality of monochromatic lights, and said image data processing unit judges a hue of said reflected light based on a ratio of light quantities and an intensity between a plurality of difference images acquired by projecting said plurality of monochromatic lights and detects said target based on said hue.

5. A three-dimensional measuring device according to claim 1, wherein said image pickup unit has a light receiving element sensitive to a blue, a green and a red, and said illumination light source unit irradiates a white light or a light including a plurality of monochromatic lights and at least one monochromatic light, and said image data processing unit judges a hue of said reflected light based on a ratio of each color in an acquired difference image projected with said white light and detects said target, and based on a difference image projected with said monochromatic light, also discriminate a white background light which varies on a time-series basis.

6. A three-dimensional measuring device according to claim 1, wherein said target has an optical property of selectively reflecting a monochromatic light of a predetermined wavelength, and said illumination light source unit irradiates a monochromatic light with an identical color to said target and a monochromatic light with a complementary color to said target, and said image data processing unit detects said target from two acquired difference images based on a difference between received light intensities.

7. A three-dimensional measuring device according to claim 4, wherein said illumination light source unit has a light emitting source coaxially aligned with respect to an optical center axis of said image pickup unit.

8. A three-dimensional measuring device according to claim 4, wherein said illumination light source unit has a plurality of light emitting sources point-symmetrically disposed with respect to an optical center axis of said image pickup unit.

9. A three-dimensional measuring device according to claim 1, wherein for said predetermined target, said control arithmetic unit acquires a plurality of difference images by the image pickup unit, while changing an image pickup direction at an angle smaller than a pixel pitch with said scanning unit, and by superimposing said difference images based on an angle from said angle detector, a detection accuracy of said reflected light is improved.

10. A three-dimensional measuring device according to claim 1, which includes a wavelength selector capable of selecting a wavelength of a light entering said image pickup unit.

11. A three-dimensional measuring system which comprises a three-dimensional measuring device installed at an arbitrary position and a target installed at a known position, comprising said three-dimensional measuring device including a light source unit for generating a distance measuring light, a light projecting optical unit for projecting said distance measuring light from said light source unit on a distance measuring optical axis, a light receiving optical unit for receiving a reflected light from an object to be measured, a light receiving element for converting said reflected light condensed by said light receiving optical unit into an electric signal, a scanning unit for scanning said distance measuring light over said object to be measured, an angle detector for detecting an projecting direction of said distance measuring light scanned by said scanning unit, an illumination light source unit for irradiating an illumination light having a plurality of wavelengths, an image pickup unit for acquiring two-dimensional images of said plurality of wavelengths, an image data processing unit for acquiring an image illuminated with said illumination light source unit and an unilluminated image by said image pickup unit, for acquiring a difference image based on both images, and for detecting a retroreflective target from said object to be measured based on a relationship between said difference image and a detected intensity of reflected lights of a plurality of wavelengths detected from said difference image, and a distance data processing unit for calculating a distance to said target based on a received light signal from said light receiving element and for calculating a three-dimensional data of said object to be measured based on a calculated distance and a detection signal from said angle detector, wherein a position of said three-dimensional measuring device with respect to said target is calculated based on said calculated distance to said target and said projecting direction of said distance measuring light detected by said angle detector.

12. A three-dimensional measuring system according to claim 11, wherein said target has an optical property of selectively reflecting a monochromatic light of a predetermined wavelength, and said illumination light contains at least a monochromatic light of said predetermined wavelength and another monochromatic light with a complementary color to said monochromatic light, and said image data processing unit judges a hue of said reflected light based on a relationship between light intensities in a reflected illumination light having a plurality of wavelengths and detects said target based on said hue.

13. A three-dimensional measuring system according to claim 11, wherein said target has an optical property of selectively reflecting a monochromatic light of a predetermined wavelength, and said illumination light source unit separately irradiates a monochromatic light with a complementary color to said target and a monochromatic light with an identical color to said target, and said image data processing unit detects said target from two acquired difference images based on a difference between light intensities.

14. A three-dimensional measuring system according to claim 11, wherein said target has a reflective sheeting, and said reflective sheeting has a first pattern area capable of reflecting a monochromatic light of a predetermined wavelength and a second pattern area capable of reflecting another monochromatic light complementary to said monochromatic light.

* * * * *